United States Patent
Lee et al.

(10) Patent No.: US 12,325,313 B2
(45) Date of Patent: Jun. 10, 2025

(54) APPARATUS FOR OUTPUTTING ALTERNATING CURRENT POWER SOURCE

(71) Applicant: LG ENERGY SOLUTION, LTD., Seoul (KR)

(72) Inventors: Dae-Woo Lee, Daejeon (KR); Young-Bo Cho, Daejeon (KR); Jin-Seok Heo, Daejeon (KR); Kwang-Seob Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/793,499

(22) Filed: Aug. 2, 2024

(65) Prior Publication Data
US 2025/0042267 A1   Feb. 6, 2025

(30) Foreign Application Priority Data
Aug. 4, 2023 (KR) .......... 10-2023-0102311

(51) Int. Cl.
*B60L 50/60* (2019.01)
*B60L 50/51* (2019.01)
*H02J 7/00* (2006.01)

(52) U.S. Cl.
CPC ............. *B60L 50/66* (2019.02); *B60L 50/51* (2019.02); *H02J 7/00032* (2020.01);
(Continued)

(58) Field of Classification Search
CPC .. B60L 50/66; B60L 2210/42; H02J 7/00032; H02J 7/005; H02J 7/0063
See application file for complete search history.

(56) References Cited

U.S. PATENT DOCUMENTS

| 5,761,058 A | 6/1998 | Kanda et al. |
| 2012/0200163 A1 | 8/2012 | Ito et al. |

(Continued)

FOREIGN PATENT DOCUMENTS

| JP | 9-47032 A | 2/1997 |
| JP | 11-339991 A | 12/1999 |

(Continued)

OTHER PUBLICATIONS

International Search Report (form PCT/ISA/210) and Written Opinion of the International Searching Authority (form PCT/ISA/237) for PCT International Application No. PCT/KR2024/011439, dated Nov. 20, 2024.

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

An AC power output device includes a switching component connected to each of a plurality of batteries and configured to turn ON or OFF an electrical connection between a corresponding battery and another battery depending on an operational state, a filter component configured to receive an output voltage from the plurality of batteries, to adjust a polarity of the output voltage from the plurality of batteries according to an operational state, and to output the voltage of the adjusted polarity, and a controller configured to control the operational states of the switching component and the filter component so that the AC power is output from the plurality of batteries.

13 Claims, 7 Drawing Sheets

(52) U.S. Cl.
CPC .......... *H02J 7/0024* (2013.01); *H02J 7/0048* (2020.01); *H02J 7/005* (2020.01); *H02J 7/0063* (2013.01); *B60L 2210/42* (2013.01)

(56) References Cited

U.S. PATENT DOCUMENTS

| | | | |
|---|---|---|---|
| 2017/0264123 A1* | 9/2017 | Mulawski | H02J 7/0014 |
| 2019/0305385 A1* | 10/2019 | Tsuchiya | B60L 3/0038 |
| 2022/0255329 A1 | 8/2022 | Yanagizawa et al. | |
| 2023/0069512 A1 | 3/2023 | Izumi et al. | |
| 2023/0268765 A1* | 8/2023 | Zhang | H01M 8/04955 |
| | | | 307/66 |

FOREIGN PATENT DOCUMENTS

| | | |
|---|---|---|
| JP | 2000-277284 A | 10/2000 |
| JP | 2015-122833 A | 7/2015 |
| JP | 2021-141750 A | 9/2021 |
| JP | 2022-120255 A | 8/2022 |
| JP | 2023-30830 A | 3/2023 |
| KR | 10-2006-0078967 A | 7/2006 |
| KR | 10-2014-0115218 A | 9/2014 |
| KR | 10-1880381 B1 | 7/2018 |
| KR | 10-2020-0020235 A | 2/2020 |
| KR | 10-2021-0031377 A | 3/2021 |

\* cited by examiner

FIG. 6

| ITEM / TIME POINT | | t1 | t2 | t3 | t4 | t5 | t6 | t7 | t8 |
|---|---|---|---|---|---|---|---|---|---|
| PRIORITY | 1 | B1 | B2 | B4 | B3 | B3 | B2 | B4 | B1 |
| | 2 | B2 | B3 | B1 | B4 | B4 | B3 | B1 | B2 |
| | 3 | B3 | B4 | B2 | B1 | B1 | B4 | B2 | B3 |
| | 4 | B4 | B1 | B3 | B2 | B2 | B1 | B3 | B4 |
| SOC (%) | B1 | 100 | 90 | 90 | 80 | 70 | 60 | 60 | 60 |
| | B2 | 100 | 100 | 90 | 80 | 70 | 70 | 60 | 60 |
| | B3 | 100 | 100 | 90 | 90 | 80 | 70 | 60 | 60 |
| | B4 | 100 | 100 | 100 | 90 | 80 | 70 | 70 | 60 |

APPARATUS FOR OUTPUTTING ALTERNATING CURRENT POWER SOURCE

CROSS-REFERENCE TO RELATED APPLICATIONS

This application is based on and claims priority from Korean Patent Application No. 10-2023-0102311, filed on Aug. 4, 2023, with the Korean Intellectual Property Office, the disclosure of which is incorporated herein in its entirety by reference.

TECHNICAL FIELD

The present disclosure relates to an alternating current power output device.

BACKGROUND

Inverters have been used in battery packs configured with battery cells or modules, to convert direct current (DC) generated in the battery packs into alternating current (AC), and AC power is output from the battery packs. For example, an inverter may convert a DC voltage of a battery pack into an AC voltage of a three phase (e.g., U, V, and W), using internal power semiconductors. The AC voltage converted in this way is supplied to, for example, Electric Vehicles (EVs) to be used as a drive source.

SUMMARY

The present disclosure provides an alternating current (AC) power output device that generates and outputs AC power from batteries connected in series or in parallel, through a switch control without using an inverter.

An AC power output device according to one aspect of the present disclosure outputs AC power from a plurality of batteries connected in series, and may include a switching component connected to each of the plurality of batteries and configured to turn ON and OFF an electrical connection between a corresponding battery and another battery depending on an operational state of the switching component and the filter component, a filter component configured to receive an output voltage from the plurality of batteries, to adjust the polarity of the output voltage from the plurality of batteries according to an operational state of the switching component and the filter component, and to output the voltage of the adjusted polarity, and a controller configured to control the operational states of the switching component and the filter component, so that the AC power is output from the plurality of batteries.

The controller may be configured to control the operational state of the switching component at each preset first cycle to change the number of batteries connected in series.

The AC power output device according to another aspect of the present disclosure may further include a measurement component configured to measure battery information including at least one of a voltage, current and temperature of each of the plurality of batteries.

The controller may be configured to determine the priority for the plurality of batteries based on the battery information measured by the measurement component, and to control the operational state of the corresponding switching component based on the determined priority.

The controller may be configured to estimate the state of charge (SOC) of each of the plurality of batteries based on the battery information, and to assign a higher priority in the order of the estimated SOC from the highest to the lowest.

The controller may be configured to estimate the SOC and the State of Health (SOH) of each of the plurality of batteries based on the battery information, and to assign a higher priority in the order of the estimated SOH and estimated SOC from the highest to the lowest.

The controller may be configured to estimate the SOC and the SOH of each of the plurality of batteries based on the battery information, and to assign a higher priority in the order of the estimated SOH from the highest to the lowest, and when the estimated SOH is the same, the controller is configured to assign a higher priority in the order of the estimated SOC from the highest to the lowest.

The controller may be configured to select a corresponding number of batteries from the plurality of batteries in the order of highest to the lowest priority at each first cycle and to control the operational state of the switching component corresponding to the selected batteries to a turn ON state so that the selected batteries are connected in series.

The controller may be configured to update the priority for the plurality of batteries at each first cycle.

The controller may be configured to control the operational state of the filter component at each preset second cycle to reverse the polarity of the output voltage from the batteries connected in series.

The switching component may be configured to include a first contact configured to be connected to one end of the battery, a second contact configured to be connected to a remaining end of the battery, and a third contact configured to be electrically connected to the first contact or the second contact when the operational state of the switching component is a turn ON state.

The AC power may be configured as non-sinusoidal AC power.

A battery pack, according to still another aspect of the present disclosure, may include the AC power output device according to the one aspect of the present disclosure.

A vehicle, according to a further aspect of the present disclosure, may include the AC power output device according to the one aspect of the present disclosure.

According to one aspect of the present disclosure, there is an advantage in generating and outputting AC power through the switch control, without using an inverter.

Further, according to one aspect of the present disclosure, since an inverter is not required, there is an advantage that the circuit configuration of a battery pack including an AC power output device may be simplified, and the production cost of the battery pack may be reduced.

The effects of the present disclosure are not limited to those mentioned above, and other effects that have not mentioned will be clearly understood by those skilled in the art from the description of the claims.

BRIEF DESCRIPTION OF THE DRAWINGS

The following drawings attached hereto exemplify the embodiments of the present disclosure and serve to further understand the technical idea of the present disclosure together with the detailed description of the disclosure to be described later. Therefore, the present disclosure should not be construed as being limited to the matters illustrated in the drawings.

FIG. 6 is a diagram schematically illustrating the priority and SOC of batteries at each time point in the embodiment of FIG. 5.

DETAILED DESCRIPTION

Figure 1:
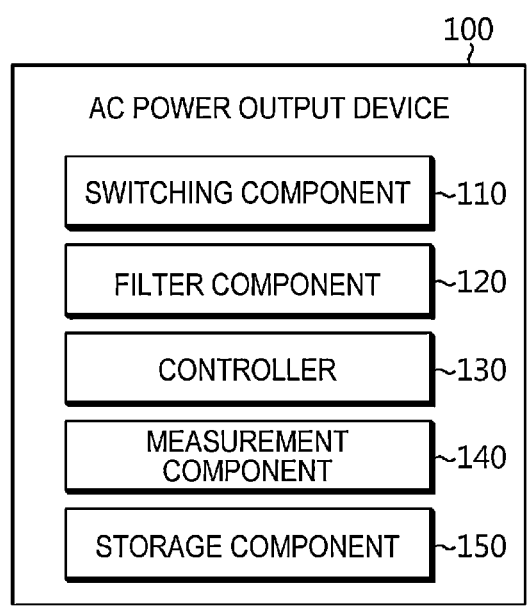
FIG. 1 is a diagram schematically illustrating an AC power output device, according to one embodiment of the present disclosure.

The terms or words used in this specification and the claims should not be interpreted as being limited to their usual or dictionary meanings, but should be interpreted as having meanings and concepts that are consistent with the technical idea of the present disclosure, based on the principles that the inventors may appropriately define the concepts of the terms to describe their disclosure in the best way possible.

Therefore, since the embodiments described in this specification and the configurations illustrated in the drawings are merely the embodiments of the present disclosure and do not represent all of the technical ideas of the present disclosure, it should be understood that various equivalents and modifications that may replace them at the time of filing may exist.

In addition, when describing the present disclosure, detailed descriptions of related known configuration or function will be omitted when they deemed to obscure the gist of the disclosure.

Terms such as "first" and "second" used to include ordinal numbers are intended to distinguish any one of various components from the others, and are not used to limit the components by these terms.

When a certain part is said to "include" a certain component throughout the specification, this means that other components may also be included unless specifically stated otherwise, rather than excluding other components.

Furthermore, throughout the specification, when a certain part is said to be "connected" to another part, this includes not only cases where they are "directly connected" but also cases where they are "indirectly connected" with other elements therebetween.

Conventionally, when using secondary batteries that mainly generate DC power, a separate component called an inverter is provided to output AC power. This causes an increase in both the cost and the size of a battery pack. For example, as the size of the battery pack increases, the size of the inverter tends to increase as well, which may result in a lower energy density of the entire battery pack. Additionally, the output efficiency of the battery pack may be reduced due to the loss in the power switching operation of the inverter itself.

The present disclosure addresses these issues by providing an AC power output device capable of generating and outputting AC power through switch control, without using an inverter, as well as a battery pack and electric vehicle (EV) including the battery pack.

Hereinafter, embodiments of the present disclosure will be described in detail with reference to the accompanying drawings.

Figure 2:
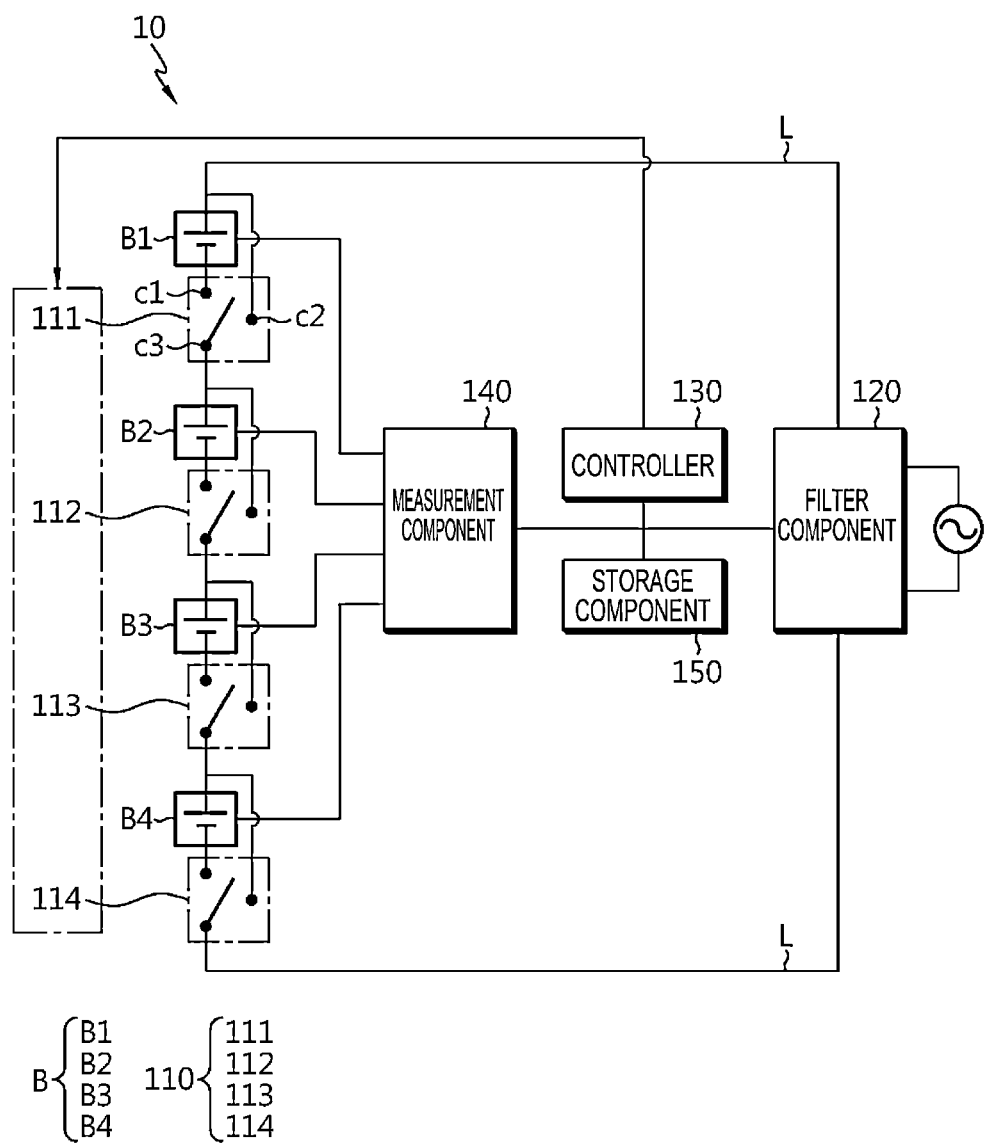
FIG. 2 is a diagram schematically illustrating an example configuration of the AC power output device, according to one embodiment of the present disclosure.

FIG. 1 is a diagram schematically illustrating an AC power output device 100 according to one embodiment of the present disclosure. FIG. 2 is a diagram schematically illustrating an example configuration of the AC power output device 100 according to one embodiment of the present disclosure.

The AC power output device 100 according to one embodiment of the present disclosure may output AC power from a plurality of batteries B1, B2, B3, and B4 connected in series. For example, the AC power output device 100 may convert DC power generated by the plurality of batteries B1, B2, B3, and B4 into AC power, and output the AC power, without a need for an inverter or similar components. Meanwhile, in the present embodiment, four batteries B1, B2, B3, and B4, including a first battery B1, a second battery B2, a third battery B3, and a fourth battery B4, are used, but this is not limiting, and for example, other numbers of batteries may be combined and used depending on the needs and environment.

Here, each battery B1, B2, B3, or B4 refers to a single physically separable, independent cell with a negative terminal and a positive terminal. In one example, each battery B1, B2, B3, or B4 may be considered as a lithium ion battery or a lithium polymer battery. Additionally, in the AC power output device 100 according to one embodiment of the present disclosure, a battery may also refer to a battery module composed of a plurality of cells connected in series and/or parallel. For the convenience of description, each battery B1, B2, B3, or B4 will be described below as representing a single independent cell.

Referring to FIG. 1, the AC power output device 100 may include a switching component 110, a filter component 120, a controller 130, a measurement component 140, and a storage component 150.

The switching component 110 may be configured to be connected to each of the plurality of batteries B1, B2, B3, and B4.

For example, in the embodiment of FIG. 2, a plurality of switching components 111, 112, 113, and 114 may be provided to correspond to the plurality of batteries B1, B2, B3, and B4, respectively. A first switching component 111 may be connected to the first battery B1, and a second switching component 112 may be connected to the second battery B2. A third switching component 113 may be connected to the third battery B3, and a fourth switching component 114 may be connected to the fourth battery B4.

The switching component 110 may be configured to turn ON and OFF the electrical connection between a corresponding battery and another battery, depending on the operational state thereof.

According to one embodiment, the operational state of the switching component 110 may include a first turn ON state, a second turn ON state, and a turn OFF state.

The turn OFF state refers to the switching component 110 being in an OFF state. When the switching component 110 is in the turn OFF state, the switching component 110 may be in a no-load state.

The first turn ON state refers to the switching component 110 being controlled by the controller 130 and connected to the corresponding battery. When the switching component 110 is in the first turn ON state, the corresponding battery is electrically connected to the other adjacent battery.

The second turn ON state refers to the switching component 110 being controlled by the controller 130, but not connected to the corresponding battery. When the switching component 110 is in the second turn ON state, the corresponding battery is not electrically connected to other batteries. For example, when the switching component 110 is in the second turn ON state, the corresponding battery is not electrically connected to the other adjacent battery.

For example, in the embodiment of FIG. 2, each switching component 111, 112, 113, or 114 may include a first contact c1, a second contact c2, and a third contact c3. For example, in the switching component 111 for the first battery B1, the first contact c1 may be configured to be connected to one end of the first battery B1, and the second contact c2 may be configured to be connected to the other end of the first battery B1. Additionally, the third contact c3 for the first battery B1 may be configured to be connected to one end of the adjacent second battery B2. Through such connections, the third contact c3 for the first battery B1 may be selectively connected to either the first contact c1 or the second contact c2, as needed. For example, when the operational state of the switching component 111 is the first turn ON state, the third contact c3 for the first battery B1 is electrically connected to the first contact c1, causing the first battery B1 to be electrically connected to the adjacent second battery B2. Then, when the operational state of the switching component 111 is the second turn ON state, the third contact c3 for the first battery B1 is electrically connected to the second contact c2, and in this case, the first battery B1 may be configured to be electrically disconnected from the adjacent second battery B2.

In the embodiment of FIG. 2, each switching component 111, 112, 113, or 114 is illustrated as positioned on the negative pole side of the corresponding battery B1, B2, B3, or B4. However, the connection position of the switching component 110 is not limited to the embodiment of FIG. 2, and each switching component 111, 112, 113, or 114 may be positioned on the positive pole side of the corresponding battery B1, B2, B3, or B4. In this case, for example, the first contact c1 for each battery may be connected to a positive pole of the battery, and the second contact c2 may be connected to a negative pole of the battery. Then, the third contact c3 for each battery may be configured to be selectively connected to either the first contact or the second contact, when the operational state of the switching component 110 is in the turn ON state.

The filter component 120 may be configured to receive an output voltage from the plurality of batteries B1, B2, B3, and B4.

For example, the filter component 120 may be connected to a high current path L of the plurality of batteries B1, B2, B3, and B4. In other words, a DC voltage output from the plurality of batteries B1, B2, B3, and B4 may be applied to the filter component 120.

For example, in the embodiment of FIG. 2, the filter component 120 may be connected to the high current path L of the plurality of batteries B1, B2, B3, and B4. In other words, the DC voltage output from the plurality of batteries B1, B2, B3, and B4 may be input to the filter component 120.

The filter component 120 may be configured to adjust the polarity of the output voltage from the plurality of batteries B1, B2, B3, and B4, depending on the operational state thereof.

For example, the filter component 120 may be configured to reverse the polarity of the output voltage received from the plurality of batteries B. For example, the filter component 120 may adjust the polarity of the output voltage to either positive (+) or negative (−), depending on the operational state thereof. Alternatively, the filter component 120 may use separate battery cells for positive and negative voltages, or employ a circuit-based approach such as a full-bridge or half-bridge configuration for the application of positive and negative voltages, to adjust the polarity of the output voltage to either positive (+) or negative (−).

The controller 130 may be configured to control the operational states of the switching component 110 and filter component 120 to ensure that AC power is output from the plurality of batteries B1, B2, B3, and B4.

The controller 130 may be connected to be able to communicate with the plurality of switching components 111, 112, 113, and 114, and the filter component 120. Then, the controller 130 may control the operational state of each of the plurality of switching components 111, 112, 113, and 114, and the operational state of the filter component 120.

For example, in the embodiment of FIG. 2, the controller 130 may be connected to each of the plurality of switching components 111, 112, 113, and 114, and the filter component 120.

According to one embodiment, the controller 130 may adjust the number of batteries that are connected from among the plurality of batteries B1, B2, B3, and B4 by controlling the switching component 110, and may adjust the polarity of the output voltage from the plurality of batteries B1, B2, B3, and B4 by controlling the filter component 120.

In one embodiment, the AC power may be configured as non-sinusoidal AC power. Since the output voltage from the plurality of batteries B1, B2, B3, and B4 is a DC voltage and the polarity of the output voltage is adjusted to AC by the filter component 120, the AC power output by the AC power output device 100 may be non-sinusoidal AC power.

Figure 3:
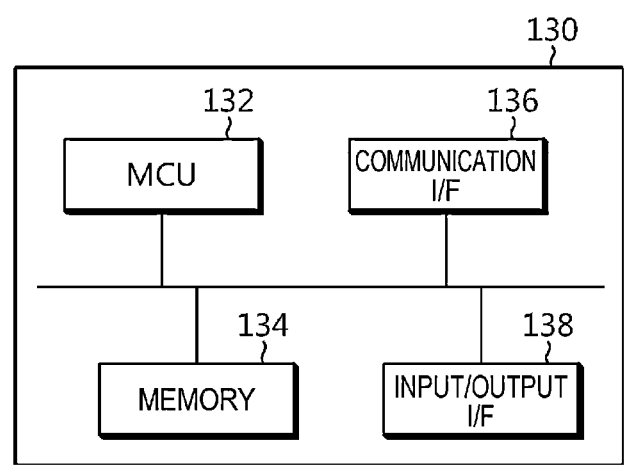
FIG. 3 is a block diagram illustrating a hardware configuration implementing a controller included in an AC power output device, according to one embodiment of the present disclosure.

FIG. 3 is a block diagram illustrating a hardware configuration implementing the controller 130 included in the AC power output device 100, according to the present disclosure.

The controller 130 according to one embodiment of the present disclosure may include a micro control unit (MCU) 132, a memory 134, a communication interface (I/F) 136, and an input/output I/F 138. The MCU 132 serves as a processor that executes various programs stored in the memory 134, processes various data used in these programs, and performs functions of the controller 130.

The memory 134 may store operation data of various programs related to the operation of a lithium secondary battery system for the operation of the controller 130. The memory 134 may be provided in a plural number as needed. The memory 134 may be a volatile or non-volatile memory. As a volatile memory, examples of the memory 134 may include a RAM, DRAM, SRAM, and others. As a nonvolatile memory, examples of the memory 134 may include a ROM, PROM, EAROM, EPROM, EEPROM, flash memory, and others. The listed examples of the memory 134 are merely illustrative and the memory 134 is not limited to these.

The communication I/F 136 is configured to be able to transmit and receive various data to and from a server, and may be any of various devices that may support wired or wireless communication. For example, the communication I/F 136 may transmit and receive programs, various data and others for the operation of the controller 130 to and from an external server, which is separately provided, in a wired or wirelessly manner. The input/output I/F 138 may provide an interface that interconnects an input device (not illustrated)

such as a keyboard, mouse, or touch panel, an output device (not illustrated) such as a display, and the MCU 132 to enable data transmission and reception therebetween.

Figure 4:
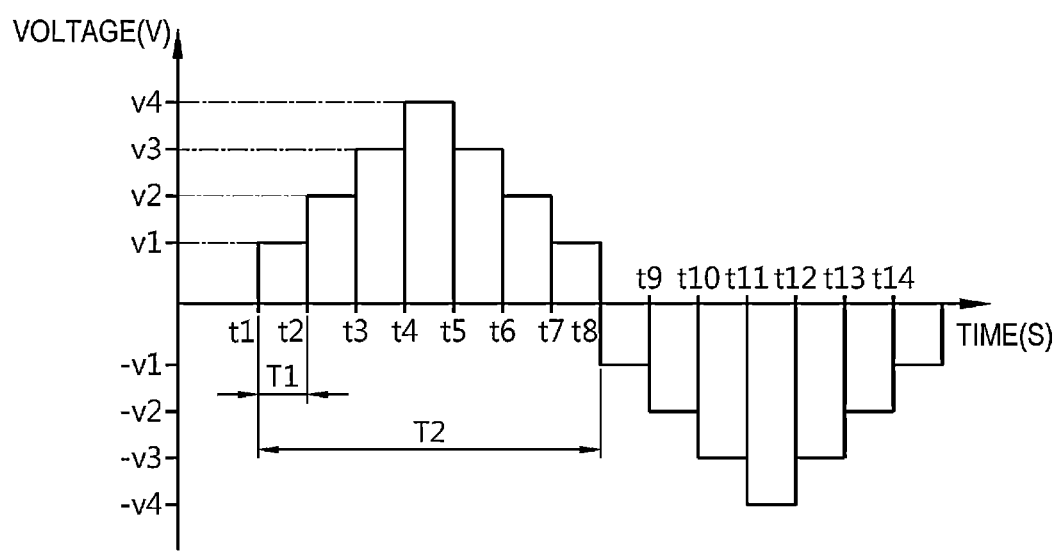
FIG. 4 is a diagram schematically illustrating an AC power, according to one embodiment of the present disclosure.

FIG. 4 is a diagram schematically illustrating an AC power according to one embodiment of the present disclosure. For example, the embodiment of FIG. 4 schematically illustrates an AC power output from a battery pack 10 illustrated in FIG. 2.

In the embodiment of FIG. 4, voltages v1, v2, v3, and v4 correspond to the voltages output by one, two, three, and four batteries, respectively. A positive voltage indicates a positive polarity, while a negative voltage indicates a negative polarity. Referring to FIGS. 2 and 4, non-sinusoidal AC power may be output, starting from time point t1, using the plurality of batteries B1, B2, B3, and B4.

The AC power output device 100 according to one embodiment of the present disclosure generates and outputs AC power from the plurality of batteries B1, B2, B3, and B4 without a need for an inverter, which is an advantage over the conventional AC power output device which requires an inverter. The AC power output device 100 according to one embodiment of the present disclosure has further advantage with a relatively simple circuit configuration, because an inverter is not required.

The controller 130 may be configured to control the operational state of the switching component 110 at each preset first cycle T1 in order to change the number of batteries connected in series.

For example, the controller 130 may control the operational state of the switching component 110 at each first cycle T1. Thus, the number of batteries connected in series may be changed at each first cycle T1.

In the embodiment of FIG. 4, assuming that AC power is output starting from time point t1, the number of batteries connected in series may be changed at each cycle T1 from time point t1. At time point t1, one battery may be connected to the filter component 120. This may result in voltage v1 being output at time point t1.

Afterwards, the number of connected batteries may be changed by one at each cycle T1. For example, at time point t2, two batteries are connected, outputting voltage v2; at time point t3, three batteries are connected, outputting voltage v3; and at time point t4, four batteries are connected, outputting voltage v4. Then, at time point t5, the number of connected batteries decreases to three, outputting voltage v3; at time point t6, two batteries are connected, outputting voltage v2; and at time point t7, one battery is connected, outputting voltage v1.

The controller 130 may be configured to control the operational state of the filter component 120 at each preset second cycle T2 to reverse the polarity of the output voltage from the batteries connected in series.

For example, the controller 130 may control the operational state of the filter component 120 at each second cycle T2. Thus, the polarity of the output voltage from the batteries may be reversed at each second cycle T2.

In the embodiment of FIG. 4, the polarity of the output voltage may be reversed at each cycle T2 starting from time point t1. In other words, at time point t1, a positive polarity voltage is output, and the polarity of the output voltage may be reversed at each cycle T2. For example, at time point t8, one battery is connected, outputting voltage-v1; at time point t9, two batteries are connected, outputting voltage-v2; at time point t10, three batteries are connected, outputting voltage-v3; and at time point t11, four batteries are connected, outputting voltage-v4. Then, at time point t12, the number of connected batteries decreases to three, outputting voltage-v3: at time point t13, two batteries are connected, outputting voltage-v2; and at time point t14, one battery is connected, outputting voltage-v1.

Referring to FIGS. 2 and 4, the AC power output device 100 according to one embodiment of the present disclosure may output AC power with a maximum voltage of "v4[V]" and a minimum voltage of "−v4 [V]," and with a cycle of "2×T2." In this way, the AC power output device 100 according to one embodiment of the present disclosure may appropriately adjust parameters such as the number and cycle of battery connections to adjust the battery voltage from the stage of generating the voltage from the batteries, ensuring that AC power with required specifications may be output without a need for components such as an inverter. Additionally, by selectively connecting the batteries used at different time points, for example, battery cells used during the peak states would have a lower usage frequency, allowing for the uniform usage of all battery cells and effectively managing battery lifespan.

Hereinbelow, descriptions are made for an embodiment in which the controller 130 controls the switching component 110 to determine the batteries connected in series among the plurality of batteries B1, B2, B3, and B4.

Referring back to FIG. 1, the AC power output device 100 may further include the measurement component 140.

The measurement component 140 may be configured to measure battery information, which includes at least one of the voltage, current, and temperature of each of the plurality of batteries B1, B2, B3, and B4.

For example, the measurement component 140 may be connected to each of the plurality of batteries B1, B2, B3, and B4. The measurement component 140 may then be configured to measure the voltage and/or temperature of each of the plurality of batteries B1, B2, B3, and B4. Additionally, the measurement component 140 may be connected to the current path of each of the plurality of batteries B1, B2, B3, and B4, and may measure the current of each of the plurality of batteries B1, B2, B3, and B4.

In the embodiment of FIG. 2, the measurement component 140 may measure the voltage of each of the first battery B1, the second battery B2, the third battery B3, and the fourth battery B4.

The measurement component 140 may be connected to the controller 130 to enable wired and/or wireless communication therebetween. The measurement component 140 may then transmit the measured battery information to the controller 130.

The controller 130 may be configured to estimate the SOC of each of the plurality of batteries B1, B2, B3, and B4, based on the battery information measured by the measurement component 140.

For example, the controller 130 may estimate the SOC based on the voltage information received from the measurement component 140, using a preset profile that represents a relationship between voltage and SOC.

In another example, the controller 130 may estimate the SOC based on voltage information and temperature information received from the measurement component 140, using a preset profile that represents the relationship among the voltage, the temperature, and the SOC. In other words, the controller 130 may use a profile that correlates the SOC with the voltage and temperature to estimate the SOC of the plurality of batteries B1, B2, B3, and B4.

The controller 130 may be configured to determine the priority of the plurality of batteries B1, B2, B3, and B4 based on the estimated SOC.

According to one embodiment, the controller 130 may be configured to assign a higher priority in the order of the estimated SOC from the highest to the lowest.

The controller 130 may also be configured to control the operational state of the corresponding switching component 110 based on the determined priority.

For example, the controller 130 may control the operational state of the corresponding switching component 110 based on the determined priority of the batteries, so that the batteries with a larger SOC are discharged first. This allows for even utilization of the plurality of batteries B1, B2, B3, and B4 during the process of outputting AC power.

According to the AC power output device 100, since the batteries are discharged based on the SOC-based priority, for example, the plurality of batteries B1, B2, B3, and B4 may degrade evenly. As a result, degradation imbalance of the plurality of batteries B1, B2, B3, and B4 may be suppressed or prevented, which may enhance the expected lifespan of the plurality of batteries B1, B2, B3, and B4.

Thus, the AC power output device 100 according to one embodiment of the present disclosure has the advantage of suppressing or preventing the degradation imbalance of the plurality of batteries B1, B2, B3, and B4, and further suppressing or preventing capacity loss for the plurality of batteries B1, B2, B3, and B4 by controlling the switching component 110 based on the SOC-based priority.

Figure 5:
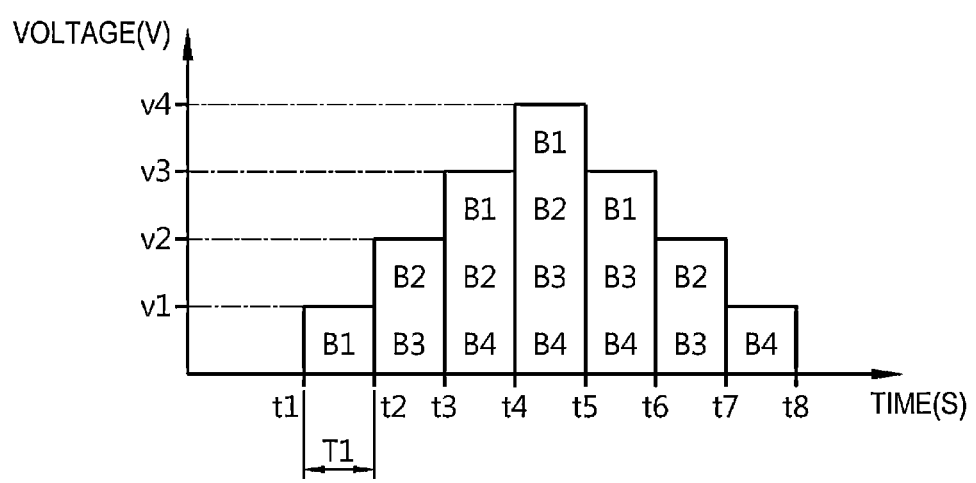
FIG. 5 is a diagram schematically illustrating an AC power, according to one embodiment of the present disclosure.

FIG. 5 is a diagram schematically illustrating the AC power, according to one embodiment of the present disclosure.

The embodiment of FIG. 5 illustrates an example in which the AC power is output from the battery pack 10 according to the embodiment of FIG. 2, starting from time point t1. For the convenience of description, illustration for the output voltage of negative polarity is omitted.

The controller 130 may be configured to select the corresponding number of batteries among the plurality of batteries B1, B2, B3, and B4 in the order of the highest to the lowest priority at each first cycle T1.

In the embodiment of FIG. 5, the first battery B1 may be selected from time point t1 to time point t2, and the second battery B2 and third battery B3 may be selected from time point t2 to time point t3. The first battery B1, second battery B2, and fourth battery B4 may be selected from time point t3 to time point t4, and the first battery B1, second battery B2, third battery B3, and fourth battery B4 may be selected from time point t4 to time point t5. The first battery B1, third battery B3, and fourth battery B4 may be selected from time point t5 to time point t6, and the second battery B2 and third battery B3 may be selected from time point t6 to time point t7. The fourth battery B4 may be selected from time point t7 to time point t8.

The controller 130 may also be configured to control the operational state of the switching component 110 corresponding to the selected batteries to the first turn ON state so that the selected batteries are connected in series.

For example, in the embodiment of FIG. 5, the first battery B1 may be discharged from time point t1 to time point t2. To this end, from time point t1 to time point t2, the controller 130 may control the first switching component 111 to be in the first turn ON state, and the second switching component 112, third switching component 113, and fourth switching component 114 to be in the second turn ON state.

The second battery B2 and third battery B3 may be connected in series and discharged from time point t2 to time point t3. To this end, from time point t2 to time point t3, the controller 130 may control the second switching component 112 and third switching component 113 to be in the first turn ON state and the first switching component 111 and fourth switching component 114 to be in the second turn ON state.

The first battery B1, second battery B2, and fourth battery B4 may be connected in series and discharged from time point t3 to time point t4. To this end, from time point t3 to time point t4, the controller 130 may control the first switching component 111, second switching component 112, and fourth switching component 114 to be in the first turn ON state, and the third switching component 113 to be in the second turn ON state.

The first battery B1, second battery B2, third battery B3, and fourth battery B4 may be connected in series and discharged from time point t4 to time point t5. To this end, from time point t4 to time point t5, the controller 130 may control the first switching component 111, second switching component 112, third switching component 113, and fourth switching component 114 to be in the first turn ON state.

The first battery B1, third battery B3, and fourth battery B4 may be connected in series and discharged from time point t5 to time point t6. To this end, from time point t5 to time point t6, the controller 130 may control the first switching component 111, third switching component 113, and fourth switching component 114 to be in the first turn ON state and the second switching component 112 to be in the second turn ON state.

The second battery B2 and third battery B3 may be connected in series and discharged from time point t6 to time point t7. To this end, from time point t6 to time point t7, the controller 130 may control the second switching component 112 and third switching component 113 to be in the first turn ON state and the first switching component 111 and fourth switching component 114 to be in the second turn ON state.

The fourth battery B4 may be discharged from time point t7 to time point t8. To this end, from time point t7 to time point t8, the controller 130 may control the fourth switching component 114 to be in the first turn ON state and the first switching component 111, second switching component 112, and third switching component 113 to be in the second turn ON state.

Meanwhile, the controller 130 may be configured to update the priority of the plurality of batteries B at each first cycle T1.

For example, when the priority of the plurality of batteries B1, B2, B3, and B4 is not updated, the degradation imbalance of the plurality of batteries B1, B2, B3, and B4 may occur. Therefore, the controller 130 may update the priority at each first cycle T1 in order to suppress or prevent the degradation imbalance of the plurality of batteries B1, B2, B3, and B4. Here, the controller 130 may estimate the SOC of the plurality of batteries B1, B2, B3, and B4 at each first cycle T1, and update the priority of the plurality of batteries B1, B2, B3, and B4 based on the estimated SOC.

FIG. 6 is a diagram schematically illustrating the priority and the SOC of the batteries at each time point in the embodiment of FIG. 5. In the embodiment of FIG. 6, it is assumed that the first battery B1, second battery B2, third battery B3, and fourth battery B4 have the same initial SOC of 100%, and the SOC of the discharged batteries decreases by 10% at each first cycle T1. For the convenience of description, it is then assumed that when the SOC of two or more batteries is the same, the battery with a lower reference numeral is assigned with a higher priority.

Referring to FIG. 6, the controller 130 may adjust the number of batteries connected in series at each first cycle T1 to output AC power. In this process, since the SOC of the plurality of batteries B1, B2, B3, and B4 may differ, the controller 130 may update the SOC-based priority of the plurality of batteries B1, B2, B3, and B4 at each first cycle T1. Then, the controller 130 may select the batteries to be connected in series at a next cycle based on the updated priority. According to one embodiment, the controller 130 may select the batteries to be connected in series at a next cycle in the order of the updated higher priority.

In the embodiment of FIG. 6, since the priority is updated at each first cycle T1, the first battery B1, second battery B2, third battery B3, and fourth battery B4 may have the same SOC of 60% at time point t8. Therefore, the degradation imbalance of the plurality of batteries B1, B2, B3, and B4 may be suppressed or prevented by updating the priority. Afterwards, the polarity of the output voltage may be reversed by the filter component 120 from time point t8, so that AC power with a negative polarity may be output from time point t8.

Meanwhile, the controller 130 may estimate the SOC and the SOH of each of the plurality of batteries B1, B2, B3, and B4 based on battery information.

For example, the controller 130 may estimate the SOC and the SOH of each of the plurality of batteries B1, B2, B3, and B4, based on battery information received from the measurement component 140. Here, the method, by which the controller 130 estimates the SOH of the plurality of batteries B1, B2, B3, and B4 based on the battery information received from the measurement component 140, may employ, for example, a conventional SOH estimation method.

The controller 130 may set the priority of each of the plurality of batteries B1, B2, B3, and B4 by considering the SOC and the SOH of the plurality of batteries B1, B2, B3, and B4. For example, the controller 130 may assign a higher priority in the order of the estimated SOH and the estimated SOC from the highest to the lowest.

Meanwhile, the controller 130 may set the priority of the batteries in the order of the estimated SOH from the highest to the lowest. Among the plurality of batteries B1, B2, B3, and B4, the batteries with the same estimated SOH may be assigned a higher priority in the order of larger estimated SOC.

The controller 130 may estimate the SOC and the SOH of each of the plurality of batteries B1, B2, B3, and B4 based on battery information, and may assign a higher priority in the order of the estimated SOH from the highest to the lowest. Then, when some of the plurality of batteries B1, B2, B3, and B4 have the same estimated SOH, the controller 130 may assign a higher priority in the order of the estimated SOC from the highest to the lowest.

For example, the controller 130 may primarily consider the estimated SOH, and secondarily consider the estimated SOC when setting the priority of the plurality of batteries B1, B2, B3, and B4. According to one embodiment, when some of the plurality of batteries B1, B2, B3, and B4 have the same estimated SOH and estimated SOC, the battery with a lower reference numeral may be assigned a higher priority. The controller 130 may then be configured to control the operational state of the corresponding switching component 110 based on the determined priority.

Furthermore, the controller 130 may be configured to update the priority based on the SOC and the SOH of the plurality of batteries B1, B2, B3, and B4 at each first cycle T1. Similar to the previous embodiments, in order to suppress or prevent the degradation imbalance of the plurality of batteries B1, B2, B3, and B4, the controller 130 may estimate the SOC and the SOH of the plurality of batteries B1, B2, B3, and B4 at each first cycle T1. Then, the controller 130 may update the priority of the plurality of batteries B1, B2, B3, and B4 at each first cycle T1 based on the estimated SOC and the estimated SOH.

The AC power output device 100 may suppress or prevent the degradation imbalance of the plurality of batteries B1, B2, B3, and B4 during the process of outputting AC power by updating the priority in consideration of the SOC and the SOH of the plurality of batteries B1, B2, B3, and B4.

Additionally, the AC power output device 100 may further include the storage component 150. The storage component 150, separate from the memory 134 of the controller 130, may store data or programs required for the operation and function of each component of the AC power output device 100, or data and others generated during the process of performing the operation and function. The storage component 150 may be any known information storage device capable of recording, erasing, updating, and reading data, without any particular limitation on the type. Examples of information storage device may include a RAM, flash memory, ROM, EEPROM, register, and others. Additionally, the storage component 150 may store program codes that define processes executable by the controller 130.

For example, the storage component 150 may store the voltage of each of the plurality of batteries B1, B2, B3, and B4 measured by the measurement component 140. The storage component 150 may also store the SOC of each of the plurality of batteries B1, B2, B3, and B4 estimated by the controller 130. The storage component 150 may then store the SOH of each of the plurality of batteries B1, B2, B3, and B4 estimated by the controller 130. Additionally, the storage component 150 may store the priority of the plurality of batteries B1, B2, B3, and B4 determined by the controller 130.

The AC power output device 100 according to the present disclosure may be applied to a Battery Management System (BMS). For example, the BMS according to the present disclosure may include the AC power output device 100 described above. In this configuration, at least some of the components of the AC power output device 100 may be implemented by supplementing or adding the functions of the components included in a conventional BMS. For example, the switching component 110, filter component 120, controller 130, measurement component 140, and storage component 150 of the AC power output device 100 may be implemented as components of the BMS.

Furthermore, the AC power output device 100 according to the present disclosure may be included in the battery pack 10. For example, the battery pack 10 according to the present disclosure may include the AC power output device 100 described above and one or more batteries. In addition, the battery pack 10 may further include electrical components (such as relay and fuse), a case, and others.

Referring back to FIG. 2, the battery pack 10 according to one embodiment of the present disclosure may include the plurality of batteries B1, B2, B3, and B4, and the AC power output device 100. Then, the battery pack 10 may output AC power through the AC power output device 100 without a need for a separate inverter.

Figure 7:
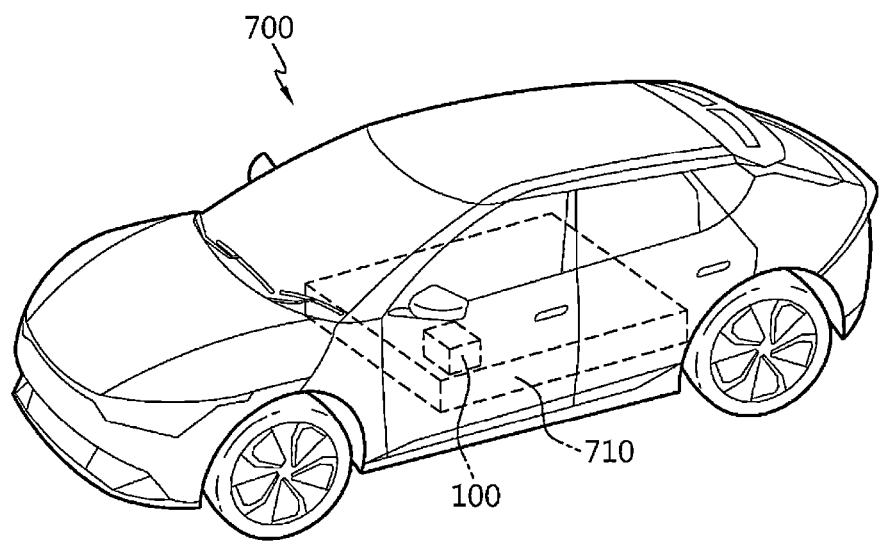
FIG. 7 is a diagram schematically illustrating a vehicle, according to another embodiment of the present disclosure.

FIG. 7 is a diagram schematically illustrating a vehicle 700 according to another embodiment of the present disclosure.

The AC power output device 100 according to the embodiment of the present disclosure may be included in the vehicle 700 such as an electric vehicle (EV) or a hybrid vehicle (HV).

For example, in the embodiment of FIG. 7, the vehicle 700 may include a battery pack 710 and the AC power output device 100. According to one embodiment, the AC power output device 100 may be included in the battery pack 710. The AC power output through the AC power output device 100 may be applied to a motor of the vehicle 700.

The vehicle 700 may be driven by applying the AC power to the motor of the vehicle 700 through the AC power output device 100.

While the present disclosure has been described above with reference to several embodiments thereof, the present disclosure is not limited by the embodiments, and various changes and modifications can be made by a person ordinarily skilled in the art to which the present disclosure pertains without departing from the technical spirit and equivalent scope of the present disclosure defined by the appended claims.

In addition, the present disclosure described above may be substituted, modified, and changed in various ways without departing from the technical spirit of the present disclosure by those skilled in the art, and therefore, the present disclosure is not limited by the above-described embodiments and the accompanying drawings. All or part of each embodiment may be selectively combined and configured to allow various modifications to be made.

What is claimed is:

1. An alternating current (AC) power output device that outputs AC power from a plurality of batteries connected in series, the AC power output device comprising:
   a switching component connected to each of the plurality of batteries and configured to turn ON or OFF an electrical connection between a corresponding battery and another battery depending on an operational state;
   a filter component configured to receive an output voltage from the plurality of batteries, to adjust a polarity of the output voltage from the plurality of batteries according to an operational state, and to output the voltage of the adjusted polarity; and
   a controller configured to control the operational states of the switching component and the filter component so that the AC power is output from the plurality of batteries.

2. The AC power output device according to claim 1, wherein the controller is configured to control the operational state of the switching component at each preset first cycle to change a number of batteries connected in series.

3. The AC power output device according to claim 2, further comprising a measurement component configured to measure battery information including at least one of a voltage, current and temperature of each of the plurality of batteries,
   wherein the controller is configured to determine a priority for the plurality of batteries based on the battery information measured by the measurement component, and to control the operational state of the corresponding switching component based on the determined priority.

4. The AC power output device according to claim 3, wherein the controller is configured to estimate a state of charge (SOC) of each of the plurality of batteries based on the battery information and to assign a higher priority in order of the estimated SOC from highest to lowest.

5. The AC power output device according to claim 3, wherein the controller is configured to estimate a SOC and a state of health (SOH) of each of the plurality of batteries based on the battery information and to assign a higher priority in order of the estimated SOH and estimated SOC from highest to lowest.

6. The AC power output device according to claim 3, wherein the controller is configured to estimate a SOC and a SOH of each of the plurality of batteries based on the battery information and to assign a higher priority in order of the estimated SOH from highest to lowest, and
   wherein if the estimated SOH is the same, the controller is configured to assign a higher priority in order of the estimated SOC from highest to lowest.

7. The AC power output device according to claim 3, wherein the controller is configured to select a corresponding number of batteries from among the plurality of batteries in order of highest to lowest priority at each first cycle and to control the operational state of the switching component corresponding to the selected batteries to a turn ON state so that the selected batteries are connected in series.

8. The AC power output device according to claim 3, wherein the controller is configured to update the priority for the plurality of batteries at each first cycle.

9. The AC power output device according to claim 2, wherein the controller is configured to control the operational state of the filter component at each preset second cycle to reverse the polarity of the output voltage from the batteries connected in series.

10. The AC power output device according to claim 1, wherein the switching component is configured to include:
    a first contact configured to be connected to one end of the battery;
    a second contact configured to be connected to a remaining end of the battery; and
    a third contact configured to be electrically connected to the first contact or the second contact when the operational state of the switching component is a turn ON state.

11. The AC power output device according to claim 1, wherein the AC power is configured as non-sinusoidal AC power.

12. A battery pack comprising the AC power output device according to claim 1.

13. A vehicle comprising the AC power output device according to claim 1.

* * * * *